United States Patent [19]
Kato et al.

[11] Patent Number: 5,185,855
[45] Date of Patent: Feb. 9, 1993

[54] CURVED SURFACE DESIGNING METHOD

[75] Inventors: Kiyotaka Kato; Takashi Okamoto, both of Hyogo, Japan

[73] Assignee: Mitsubishi Denki K.K., Tokyo, Japan

[21] Appl. No.: 770,787

[22] Filed: Oct. 7, 1991

Related U.S. Application Data

[63] Continuation of Ser. No. 226,015, Jul. 29, 1988, abandoned.

[30] Foreign Application Priority Data

Jul. 29, 1987 [JP] Japan .................. 62-187833
Nov. 27, 1987 [JP] Japan .................. 62-297851

[51] Int. Cl.$^5$ .......................................... G06F 15/626
[52] U.S. Cl. .................................. 395/129; 395/141; 364/474.24; 340/747
[58] Field of Search ............... 340/728, 747, 701, 703; 395/128, 129, 141, 142, 143; 364/468, 474.24

[56] References Cited

U.S. PATENT DOCUMENTS

| | | | |
|---|---|---|---|
| 4,491,906 | 1/1985 | Kishi et al. | 364/191 |
| 4,594,673 | 6/1986 | Holly | 364/522 |
| 4,658,247 | 4/1987 | Gharachorloo | 340/747 |
| 4,660,029 | 4/1987 | Houda et al. | 340/744 |
| 4,791,582 | 12/1988 | Ueda et al. | 364/522 |
| 4,825,391 | 4/1989 | Merz | 364/526 |
| 4,829,456 | 5/1989 | Joonishi et al. | 364/522 |
| 4,864,520 | 9/1989 | Setoguchi et al. | 364/560 |

OTHER PUBLICATIONS

"Shape Processing Technology II," Fujio Yamaguchi, The Nikkan Kogyo Shinbun Ltd., Dec. 28, 1982, pp. 61–66.
"Solid Modeling," Hiroaki Chiyokura, Kogyo Chosakai Publishing Co., Ltd., Apr. 30, 1985, pp. 109–118.

Primary Examiner—Gary V. Harkcom
Assistant Examiner—Phu K. Nguyen
Attorney, Agent, or Firm—Sughrue Mion Zinn Macpeak & Seas

[57] ABSTRACT

A curved surface designing method comprises the steps of a first step of inputting edge shape data of n-sides of a curved surface, a second step of obtaining a regular n-sided polygon in a parameter space on the basis of the given data of n sides, a third step of calculating distance parameters on the basis of the regular n-sided polygon obtained by the second step, a fourth step of calculating blending values on the basis of the distance parameters, a fifth step of mapping an inner point D of the regular n-sided polygon onto the respective sides so as to calculate boundary parameters, a sixth step of calculating at least one of three-dimensional coordinate points, and, if necessary, tangent vectors, on sides which are boundaries of the curved surface on the basis of the boundary parameters, and a seventh step of calculating arbitrary points on the curved surface on the basis of the distance parameters, the blending values, the three-dimensional coordinate points of the respective sides, and, if necessary, the tangent vectors, of the respective sides.

18 Claims, 9 Drawing Sheets

CURVED SURFACE DESIGNING METHOD

This is a continuation of application Ser. No. 07/226,015 filed Jul. 29, 1988, now abandoned.

BACKGROUND OF THE INVENTION

The present invention relates to a method of designing a curved surface used for curved surface display and curved surface cutting in a CAD/CAM system (Computer Aided Design/Computer Aided Manufacturing System) loaded in a personal computer, an engineering work-station, a numerical control machine tool, or the like.

Conventional curved surface designing methods have generally related to four-sided surfaces, such as a Coons curved surface, a Bezier curved surface, and the like, in which a curved surface is designed with four sides. As a method of designing a three-sided curved surface patch, there is, for example, such a method as described in Fujio Yamaguchi, "Shape Processing Techhology II", The Nikkan Kogyo Shinbun Ltd., Dec. 28, 1982, pp. 61-66.

As a method of designing three-sided, five-sided and six-sided curved surface patches, there is such a method as described in Hiroaki Chiyokura, "Solid Modeling", Kogyo Chosakai Publishing Co., Ltd., Apr. 30, 1985, pp. 109-118.

The former includes a method in which a quadrangular patch is contracted and a method in which a curved surface is designed by three parameters u, v and w. The latter includes a method in which a polygonal patch is formed by plural quadrangular patches (PT1), (PT2), (PT3), (PT4) and (PT5).

In such conventional curved surface designing methods as described above, a quadrangular patch is mainly used, a method related to a three-sided curved surface patch or a five-or-more-sided curved surface patch has an algorithm which is effective only for a three-sided curved surface, or another method is a complicated one in which a polygonal patch is composed of quadrangular patches.

SUMMARY OF THE INVENTION

The present invention has been attained to solve the foregoing problems, and an object thereof is to provide a method of designing a polygonal curved surface with three or more sides in a simple way and at a high speed.

A curved surface designing method according to the present invention comprises the steps of: a first step of inputting edge shape data of n sides of a curved surface where n is an integer above three, a second step of obtaining a regular n-sided polygon in a parameter space on the basis of the given data of n sides, a third step of calculating distance parameters on the basis of the regular n-sided polygon obtained by the second step, a fourth step of calculating blending values on the basis of the distance parameters, a fifth step of mapping an inner point P of the regular n-sided polygon onto the respective sides so as to calculate boundary parameters, a sixth step of calculating at least one of three-dimensional coordinate points, and, if necessary, tangent vectors, on sides which are boundaries of the curved surface on the basis of the boundary parameters, and a seventh step of calculating arbitrary points on the curved surface on the basis of the distance parameters, the blending values, the three-dimensional coordinate points of the respective sides, and, if necessary, the tangent vectors, of the respective sides.

DETAILED DESCRIPTION OF THE INVENTION

Preferred embodiments of the present invention will be described in detail with reference to the accompanying drawings.

Figure 1:
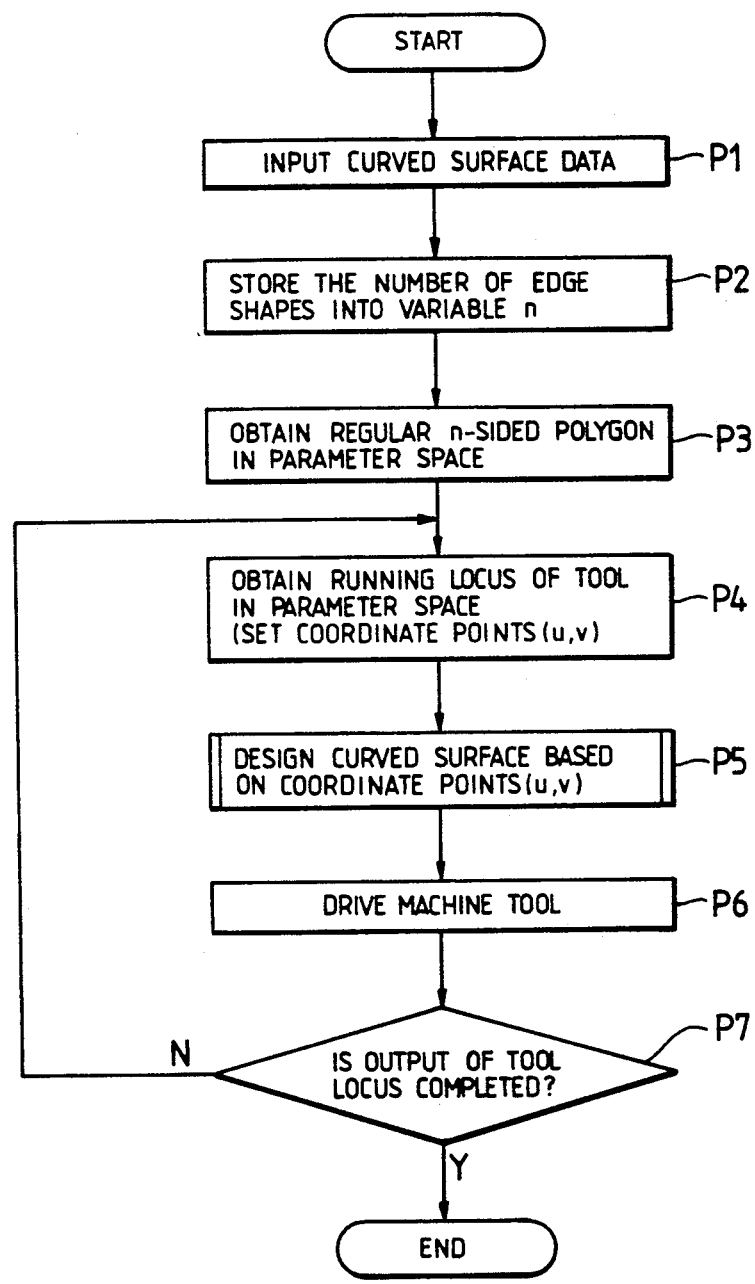
FIGS. 1 and 2 are flow charts for a curved surface creating method according to the present invention.
Figure 2:
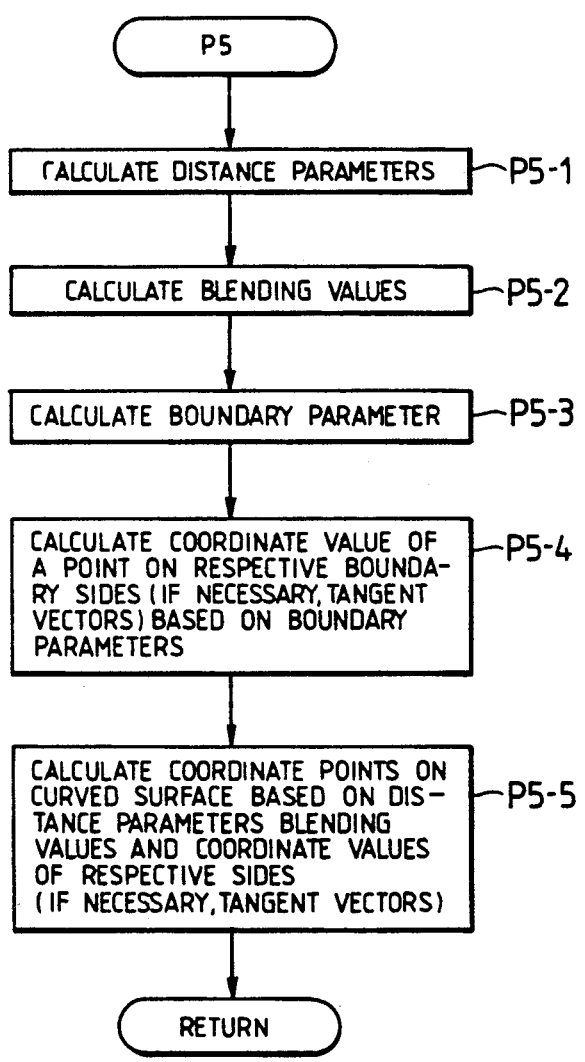

FIGS. 1 and 2 are flow charts for executing the curved surface designing method according to the present invention.

Figure 4:
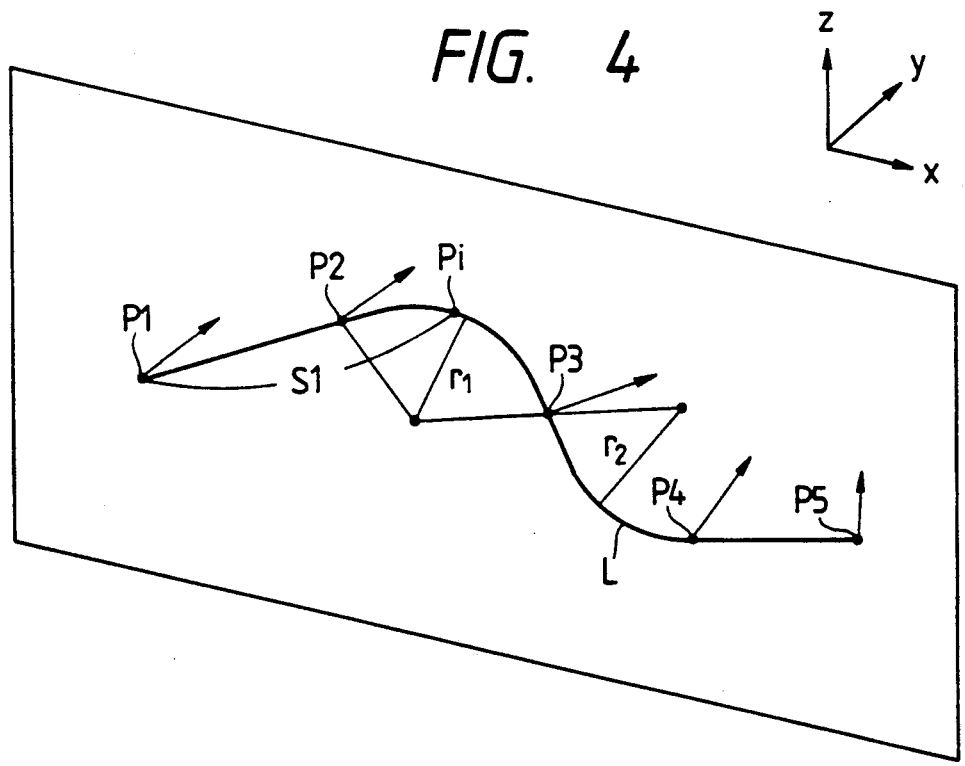
FIG. 4 is a diagram for explaining the case in which a plane curve is inputted in the curved surface data input means.
Figure 5:
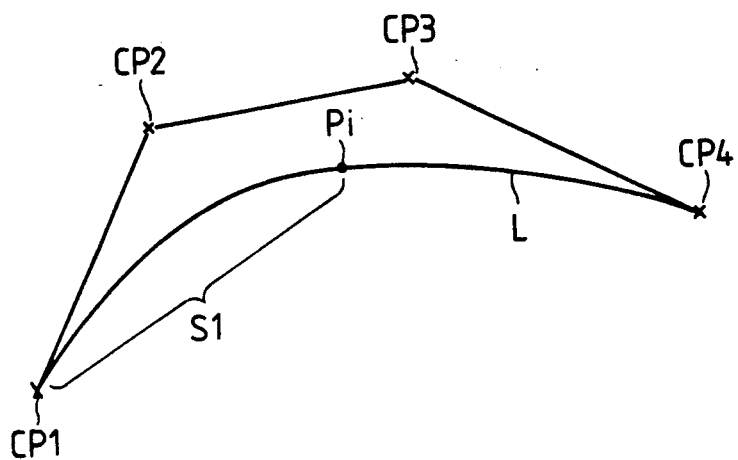
FIG. 5 is a diagram for explaining the case in which a space curve is inputted in the same manner as that in FIG. 4.

In FIG. 1, P1 represents a step of inputting curved surface data. For example, in a case where the method is executed in an NC machine tool illustrated by way of example in FIG. 3, information with respect to an edge shape forming a curved surface of an object and, if necessary, information with respect to tangent vectors in the edge shape of the curved surface are inputted by using a data input device (D1). There may be inputted as the edge shape information of the curved surface, for example, a plane curve such as a connected line composed of straight lines and circular arcs which are located at the same plane as shown in FIG. 4, or a space curve such as a Bezier curve having control points (CP1), (CP2), (CP3), (CP4) and (CP5) as shown in FIG. 5.

Figure 8:
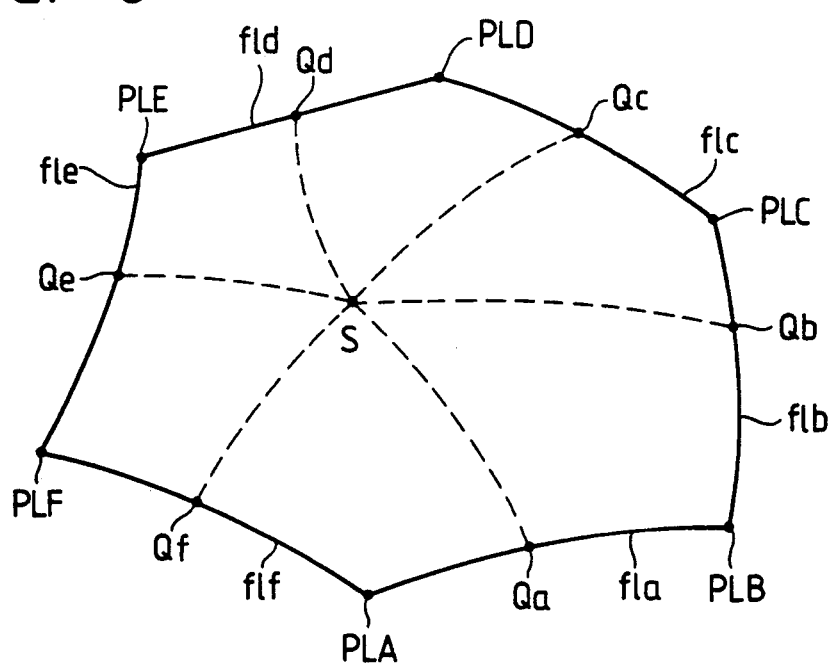
FIG. 8 is an explanation diagram illustrating the output of the origin in a parameter space.

The whole edge shape of the curved surface is determined by combining plural plane curves or plural space curves as shown in FIG. 8. For example, in order to obtain the plane curve as shown in FIG. 4, three-dimensional coordinate values of the points (P$_1$, P$_2$, P$_3$, P$_4$, and P$_5$) corresponding to respective both ends of two straight lines and two circular arcs and radiuses (r$_1$ and r$_2$) of the circular arcs are inputted as an edge shape information, and the function of the plane curve in the three dimensional coordinate is determined on the basis of the inputted edge shape information.

Figure 6:
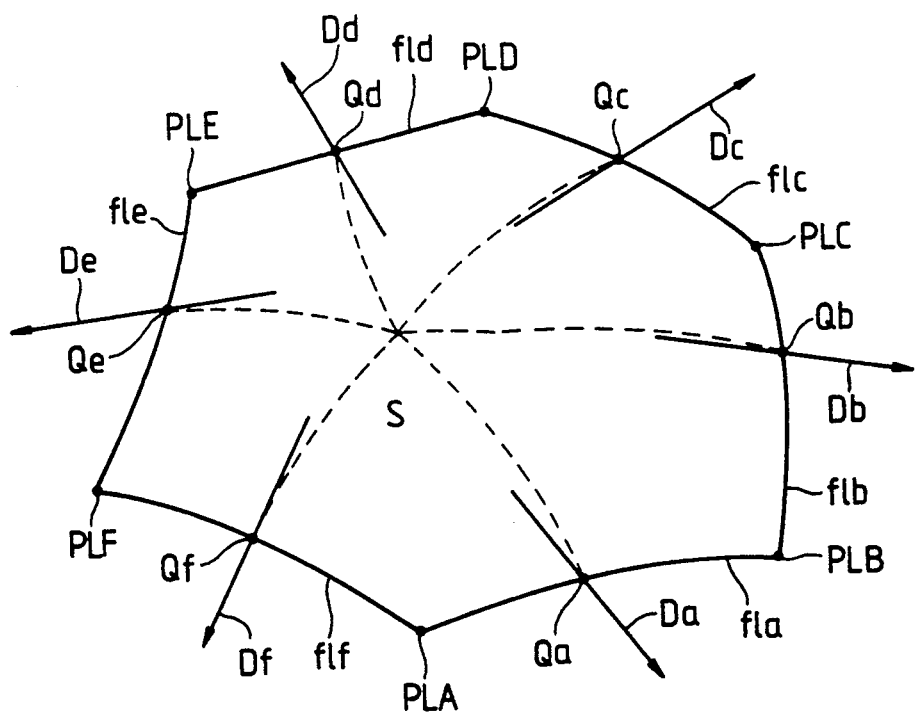
FIG. 6 is a diagram for explaining the case in which six sides of an edge shape of a curved surface are inputted.

FIG. 6 is a diagram illustrating an example of a case where data of an edge shape of a curved surface having six sides are inputted. That is, the data of the six sides (fl$_a$), (fl$_b$), (fl$_c$), (fl$_d$), (fl$_e$) and (fl$_f$) of the edge shape are inputted. When it is desired to continuously connect a plurality of curved surfaces which have been defined, it is considered to control the tangent vectors at the boundaries where the curved surfaces are connected to each other. For example, it is proposed to make the directions of both the tangent vectors at each connecting point (boundary) agree with each other. In this case, the tangent vectors (D$_a$), (D$_b$), (D$_c$), (D$_d$), (D$_e$) and (D$_f$) as illustrated also in FIG. 6 may be inputted.

Returning to FIG. 1, P2 represents a step in which the number of the edge shapes of the curved surfaces inputted in such a manner as described above, that is, the number of the combined plural plane or space curves is stored into a variable n where n is an integer not less than three.

P3 in FIG. 1 represents a step of obtaining a regular n-sided polygon in a two-dimensional parameter space U,V. The regular n-sided polygon is made such that the center thereof comes to the origin (O) in the parameter space U,V, and is normalized such that the distance between sides parallel and opposite to each other is made to be 1.0 when the n is an even number, while the distance between a side and a point opposite to the side (a point at a longest distance from the side) is made to be 1.0 when the n is an odd number. That is, the size of the regular n-sided polygon is normalized so that a length of a perpendicular from any point inside the regular n-sided polygon to any side of the regular n-sided polygon is not larger than 1.0.

Figure 7:
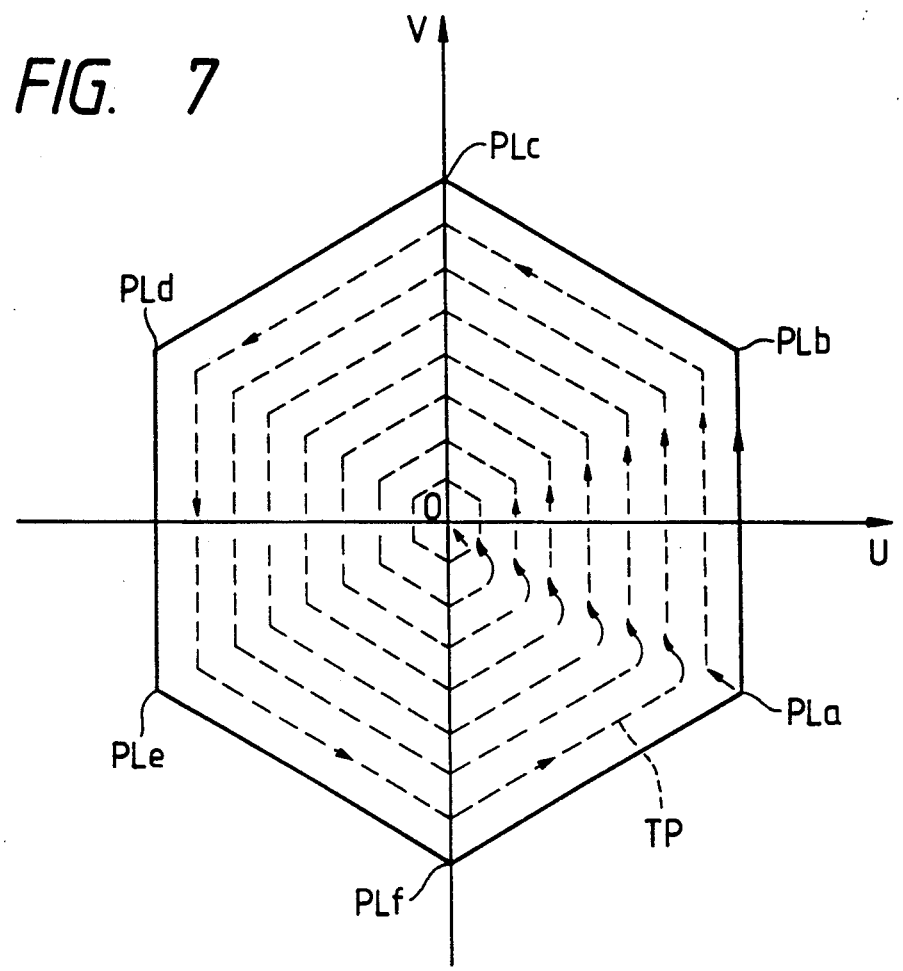
FIG. 7 is a diagram for explaining the case in which a tool running locus is produced in the form of a spiral in a parameter space.

P4 in FIG. 1 represents a step of obtaining a running locus of a tool in the parameter space U,V, which outputs coordinate points (u,v) one by one. FIG. 7 is a diagram illustrating an example in which a tool running locus (TP) is produced in the form of a spiral from a point (PL$_a$) to the origin (O) in a parameter space U,V.

P5 in FIG. 1 represents a step of obtaining three-dimensional coordinate points (x, y, z) of any point on a curved surface on the basis of coordinate points (u,v). The curved surface designing method with respect to this step will be described later in detail.

P6 in FIG. 1 represents a step of generating a tool locus on the basis of the three-dimensional coordinate points (x, y, z) obtained in the step P5 to thereby drive a machine tool.

P7 represents a step of judging whether the output of the tool locus has completed or not. In an example shown in FIG. 8, it is judged that the output of the tool locus has completed when the values of n n become zero, that is, when the tool locus at the origin is outputted. Then the processing ends.

FIG. 2 is a flow chart for explaining the detail of the curved surface designing method of the step P5 in FIG. 1.

In FIG. 2, P5-1 represents distance parameter calculating step of calculating lengths of perpendiculars from a given coordinate point (u, v) to sides of a regular n-sided polygon normalized in a parameter space U,V.

Figure 9:
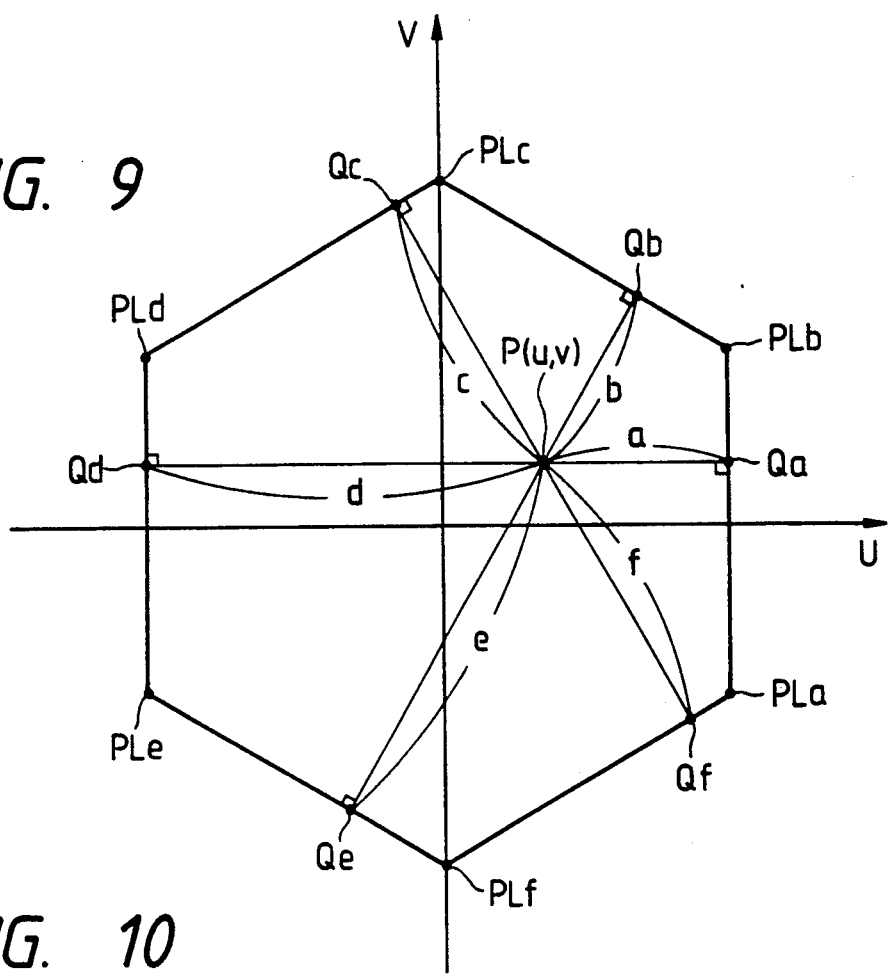
FIG. 9 is a diagram for explaining a method of calculating distance parameters in the case of a regular hexagon.

FIG. 9 is a diagram illustrating a method of calculating the distance parameters in the case of a regular hexagon. That is, respective points (Q$_a$), (Q$_b$), (Q$_c$), (Q$_d$), (Q$_e$) and (Q$_f$) of perpendiculars from a given point P(u,v) to the respective sides are obtained, and then the respective lengths of segments PQ$_a$, PQ$_b$, PQ$_c$, PQ$_d$, PQ$_e$, and PQ$_f$ are calculated as distance parameters. The distance parameters thus obtained are respectively represented by a, b, c, d, e and f hereinafter. Assume that the regular n-sided polygon has been normalized, and the following condition is always satisfied if the given point P(u, v) exists inside the regular n-sided polygon.

$$0 \leq a,b,c,d,e,f \leq 1$$

Further, when it is impossible to draw a perpendicular from the point P directly to any of the sides, the perpendicular is drawn from the point P to a prolonged line of that side. Even in this case, it is not to say that the distance parameters take the values not smaller than 0 and not larger than 1.

Figure 10:
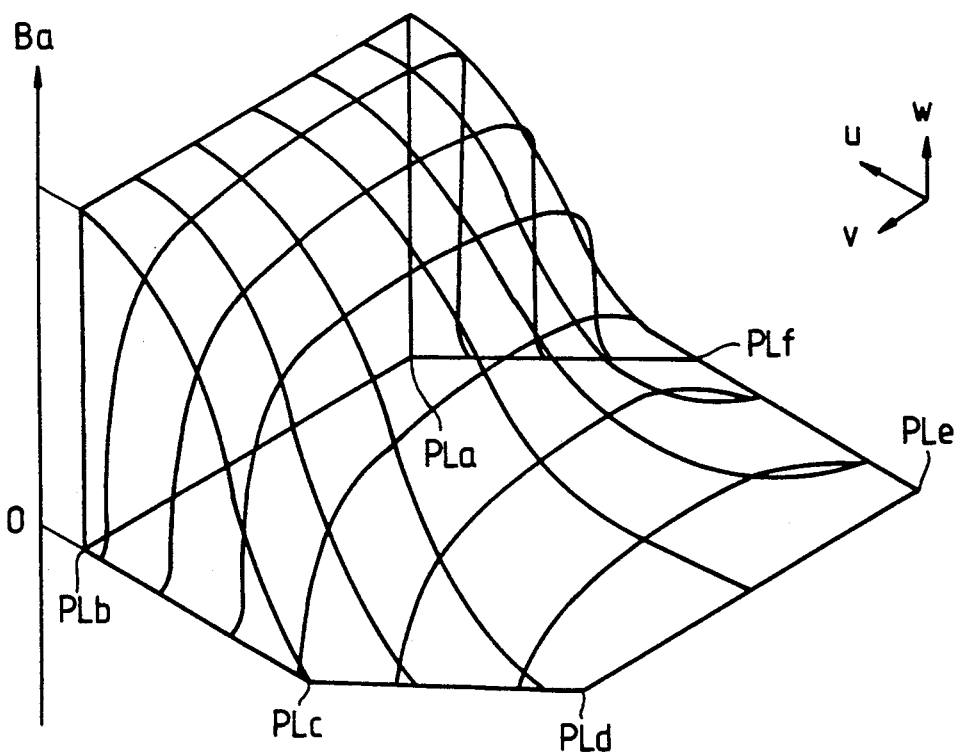
FIG. 10 is a diagram illustrating the shape of a blending function $B_a$ in three dimensions.

Returning to FIG. 2, P5-2 represents a blending value calculating method in which blending values for obtaining the rate of mixture of the three-dimensional coordinate values of the respective sides in order to determine the coordinate values of the respective sides on the curved surface are obtained on the basis of the distance parameters obtained in the step P5-1. the blending values B$_a$, B$_b$, B$_c$, B$_d$, B$_e$, and B$_f$, are obtained by the expressions as follows:

$$B_a = \Phi_a/S$$

$$B_b = \Phi_b/S$$

$$B_c = \Phi_c/S$$

$$B_d = \Phi_d/S$$

$$B_e = \Phi_e/S$$

$$B_f = \Phi_f/S$$

where
$\Phi_a = (1-a^2)b^2c^2d^2e^2f^2$
$\Phi_b = (1-b^2)c^2d^2e^2f^2a^2$
$\Phi_c = (1-c^2)d^2e^2f^2a^2b^2$
$\Phi_d = (1-d^2)e^2f^2a^2b^2c^2$
$\Phi_e = (1-e^2)f^2a^2b^2c^2d^2$
$\Phi_f = (1-f^2)a^2b^2c^2d^2e^2$ and
$S = \Phi_a + \Phi_b + \Phi_c + \Phi_d + \Phi_e + \Phi_f$ FIG. 10 is a diagram expressing the shape of the blending function B$_a$ in three dimensions. The function takes the value 1 on the side between points PL$_a$ and PL$_b$, that is,m at the distance parameter a=0, and takes the value 0 on the other sides, that is, at b=0, c=0, e=0 and f=0. The partial differential by the distance parameter a is established as follows:

$$\frac{\partial B_a}{\partial a} = \left[ \frac{\partial \Phi_a}{\partial a}(\Phi_b + \Phi_c + \ldots + \Phi_f) - \Phi_a\left(\frac{\partial \Phi_b}{\partial a} + \frac{\partial \Phi_c}{\partial a} + \ldots + \frac{\partial \Phi_f}{\partial a}\right)\right]/S^2$$

Assuming then that the variables a and b are independent variables, the other variable a, d, n and f are dependent variables, and the above equation is therefore expanded by using a=0 so that the following result is obtained.

$$\frac{\partial B_a}{\partial a} = 0 \ (a = 0)$$

Taking the partial differential by a distance parameter i (where the i is a distance parameter other than a) into consideration, $$\frac{\partial B_a}{\partial i} = \left[ \frac{\partial \Phi_a}{\partial i} (\Phi_b + \Phi_c + \ldots + \Phi_f) - \Phi_a \left( \frac{\partial \Phi_b}{\partial i} + \frac{\partial \Phi_c}{\partial i} + \ldots + \frac{\partial \Phi_f}{\partial i} \right) \right] / S^2$$

is obtained. Assuming then that the variable i and another variable are independent variables, the other variables are dependent variables, and the above equation is expanded by using i=0 so that the following result is obtained.

$$\frac{\partial B_a}{\partial i} = 0 \ (i = 0)$$

In short, the partial differentials of the blending function $B_a$ by the distance parameters a, b, c, d, e and f take the value of zero at the position where the respective distance parameters take the value of zero. It is not to say that the same is also established upon the blending functions $B_b$, $B_c$, $B_d$, $B_e$ and $B_f$.

The above equations mean that the partial differentials of the blending functions with respect to the distance parameters corresponding to the respective sides of the regular n-sided polygon become zero on the respective sides.

Thus, the blending values $B_a$, $B_b$, $B_c$, $B_d$, $B_e$ and $B_f$ are obtained correspondingly to a given point P(u, v) in the parameter space by the above mentioned method.

Returning to FIG. 2, P5-3 represents a boundary parameter calculating step which is a process in which points on the respective sides corresponding to the point P within the regular n-sided polygon in the two-dimensional parameter space are obtained and boundary parameter values of those points with respect to the respective sides are calculated.

FIG. 11 is a diagram for explaining an algorithm of the step P5-3. In FIG. 11, there are given the regular hexagon $PL_a \to PL_b \to PL_c \to PL_d \to PL_e \to PL_f$ and the point P(u, v) in FIG. 11. Points $Q_b$ and $Q_f$ drawn from the point P(u, v) perpendicularly onto the sides $PL_b \to PL_c$ and $PL_f \to PL_a$ adjacent to the side $PL_a \to PL_b$ are obtained (if it is impossible to draw feet perpendicular onto adjacent sides, the points such as points $Q'_b$ and $Q'_f$ are obtained on the respective prolonged lines of the adjacent sides), and a boundary parameter $t_a$ is obtained from the following equation.

$$t_a = \overline{PQ_f}/(\overline{PQ_b} + \overline{PQ_f})$$

With respect to the other sides, boundary parameters $t_b$, $t_c$, $t_d$, $t_e$ and $t_f$ are respectively obtained in the same manner.

Figure 11A:
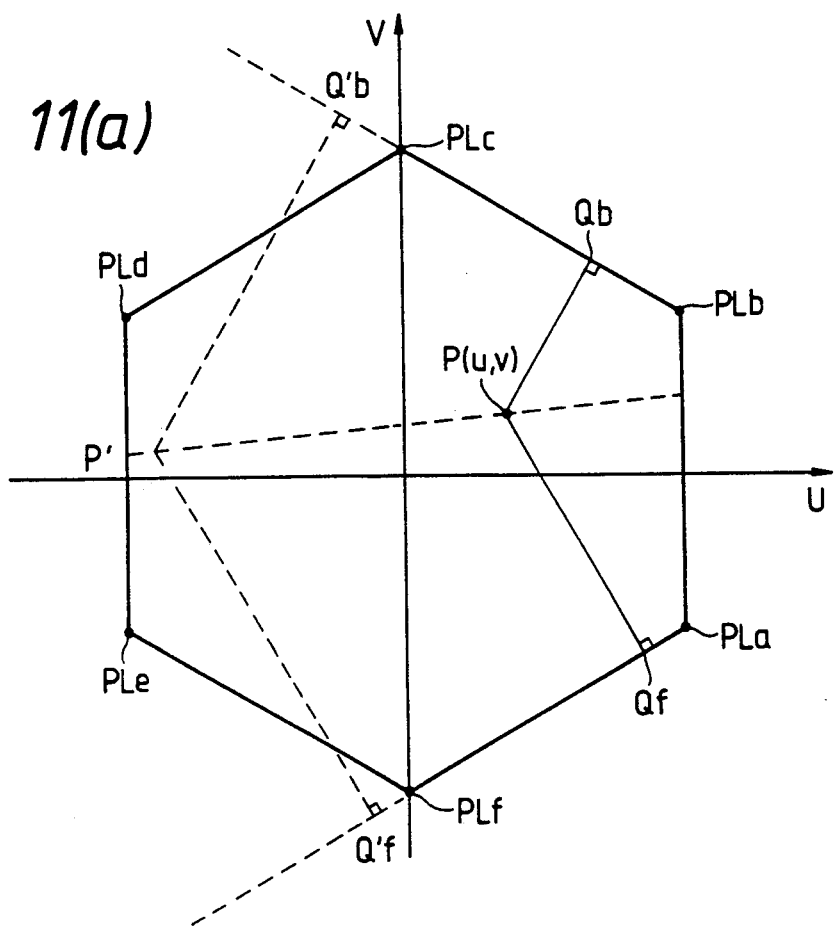
FIGS. 11(a) and 11(b) are explanatory diagrams of an algorithm in the step (P5-3) in FIG. 2.

Considering the above boundary parameter calculation method geometrically, any point on a straight line connecting the point P with a point P' in FIG. 11(a) takes the same boundary parameter value, and is mapped to a point on the side $PL_a \to PL_b$. That is, any point inside the regular hexagon is mapped onto the respective sides.

Figure 11B:
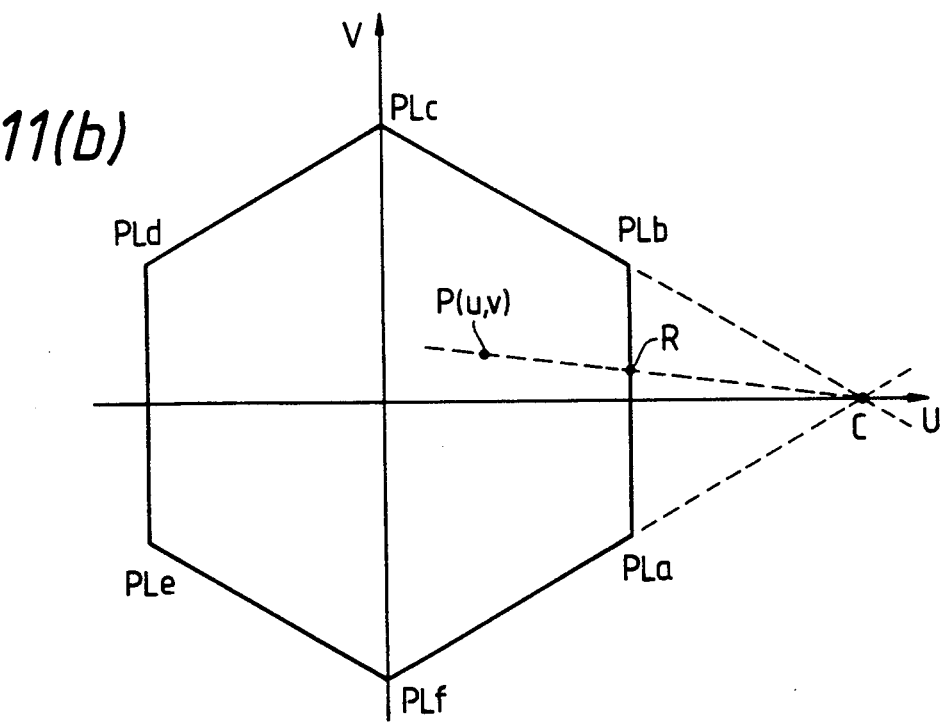
Figure 12:
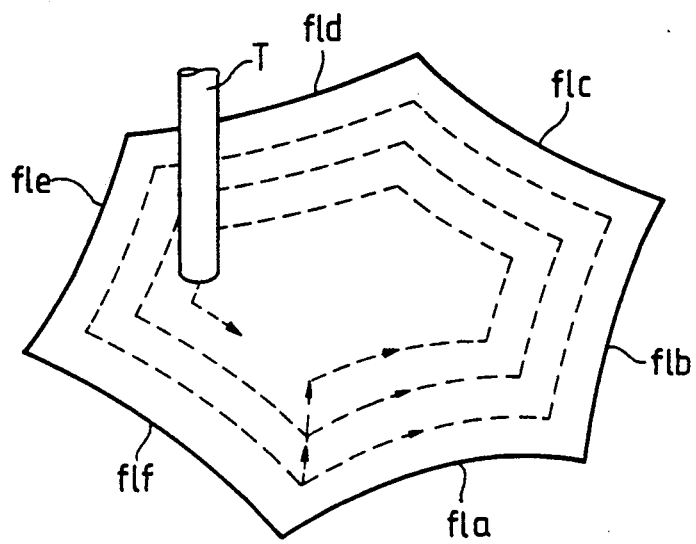
FIG. 12 is a diagram for explaining the processing of a polygonal curved surface patch.

The boundary parameters may be obtained as shown in FIG. 11(b). That is, a point R at which an arbitrary point P within the regular hexagon is mapped onto the side $PL_a \to PL_b$ is obtained as a point of intersection of the side $PL_a \to PL_b$ and a straight line connecting the point P with a point of intersection of the respective prolonged lines of the adjacent sides $PL_c \to PL_b$ and $PL_f \to PL_a$. The boundary parameter $t_a$ is obtained from the following equation.

$$t_a = \overline{PL_aR}/(\overline{PL_aR} + \overline{PL_bR})$$

The boundary parameters $t_b$, $t_c$, $t_d$, $t_e$ and $t_f$ with respect to the other sides are obtained in the same manner.

Any point inside the regular hexagon is mapped onto the respective sides in the method in FIG. 11 (b) in the same manner as that in FIG. 11 (a).

Next, P5-4 is a step in which the three-dimensional coordinate value of any point on the respective boundary sides and the tangent vectors on the respective sides are calculated on the basis of the boundary parameters obtained in the step P5-3. For example, in a case where a three-dimensional coordinate value of any point on the plane curve as shown in FIG. 4 is determined on the basis of a boundary parameter t, first the whole length L of the plane curve is determined on the basis of inputted edge shape information as described above, secondly the whole length L thus obtained is multiplied by the boundary parameter t to obtain a value of multiplication Lt, and lastly a three-dimensional coordinate value of the point corresponding to the length Lt on the plane curve is determined on the basis of the function of the plane curve.

FIG. 4 illustrates an example in which the inputted edge shape data are given in the form of two straight lines and two circular arcs. Practically, a curve L from a point P1 to a point P5 is normalized and stored in a computer. That is, a parameter S1 takes the value within a range of from 0 to 1 correspondingly to from the point P1 to the point P5. Data are stored such that a three-dimensional coordinate value on the curve L can be obtained if the parameter S1 is given. FIG. 5 is a diagram for explaining the inputted edge shape data in the same manner as FIG. 4, in which a curve well-known as a Bezier curve is shown. If control points CP1, CP2, CP3 and CP4 are given so as to define the curve, the three-dimensional coordinate value on the curve L is obtained. Assuming that the space coordinate values of the control points are $CP_1$, $CP_2$, $CP_3$ and $CP_4$, the point P(S1) is obtained from the following equation.

$$P(S1) = (1-S1)^3 CP_1 + 3(1+S1)^2 S1 CP_2 + 3(1-S1)S1^2 CP_3 + S1^3 CP_4$$

On the other hand, arrangement is made so that the values of the tangent vectors can be obtained also in the computer if the parameter S1 is given in the same manner as above. The thus obtained three-dimensional coordinate values and tangent vectors of the respective sides will be respectively referred to as $Q_a$, $Q_b$, $Q_c$, $Q_d$ and $Q_f$ and $D_a$, $D_b$, $D_c$, $D_d$ and $D_f$ hereinafter.

Finally, P5-5 in FIG. 2 is a step in which points on the curved surface are calculated on the basis of the distance parameters a, b, c, d, e and f, the blending values $B_a$, $B_b$, $B_c$, $B_d$, $B_e$ and $B_f$, the three-dimensional coordinate values $Q_a$, $Q_b$, $Q_c$, $Q_d$ and $Q_f$ of the respective sides, and, if necessary, the tangent vectors $D_a$, $D_b$, $D_c$, $D_d$, $D_e$ and $D_f$ of the respective sides, which are obtained in the foregoing steps (P5-1), (P5-2), (P5-3) and (P5-4). A point S on the curved surface is calculated by, $$S = \sum_{i=a}^{f} B_i(Q_i + iD_i)$$

FIG. 6 is a diagram illustrating the above calculation. The coordinate value of the S becomes a given edge coordinate value due to the characteristic of the blending function $B_i$. The reason is that, for example, when $a=0$, $B_a=1$, $B_b=0$, $B_c=0$, $B_d=0$, $B_e=0$, $B_f=0$ are established so that the equation $S=Q_a$ is established, and the similar is also established when $b=0$, $c=0$, $d=0$, $e=0$ or $f=0$. On the other hand, the tangent vector in the edge of the curved surface is given n by the following equation. For example, when $a=0$, the equation $$\frac{\partial S}{\partial a} = \frac{\partial}{\partial a} \sum_{i=a}^{f} B_i (Q_i + iD_i)$$

$$= \sum_{i=a}^{f} \left[ \frac{\partial B_i}{\partial a} (Q_i + iD_i) + B_i \frac{\partial}{\partial a} (Q_i + iD_i) \right]$$

is established, but the relation $$\frac{\partial B_i}{\partial a} = 0 \ (a = 0)$$

is established so that the first term of the above equation becomes zero. Further, when $a=0$, $B_a=1$, $B_b=B_cB_d=B_eB_f=0$ Accordingly, $$\frac{\partial S}{\partial a} = B_a \frac{\partial}{\partial a} (Q_a + aD_a) = \frac{\partial Q_a}{\partial a} + D_a + a \frac{\partial D_a}{\partial a}$$

$$\frac{\partial S}{\partial a} = D_a + \frac{\partial Q_a}{\partial a} \ (a = 0)$$

is established. In the same manner, it is understood that, $$\frac{\partial S}{\partial b} = D_b + \frac{\partial Q_b}{\partial b} \ (b = 0)$$

$$\frac{\partial S}{\partial c} = D_c + \frac{\partial Q_c}{\partial c} \ (c = 0)$$

$$\frac{\partial S}{\partial d} = D_d + \frac{\partial Q_d}{\partial d} \ (d = 0)$$

$$\frac{\partial S}{\partial e} = D_e + \frac{\partial Q_e}{\partial e} \ (e = 0)$$

$$\frac{\partial S}{\partial f} = D_f + \frac{\partial Q_f}{\partial f} \ (f = 0)$$

are established.

Figure 3:
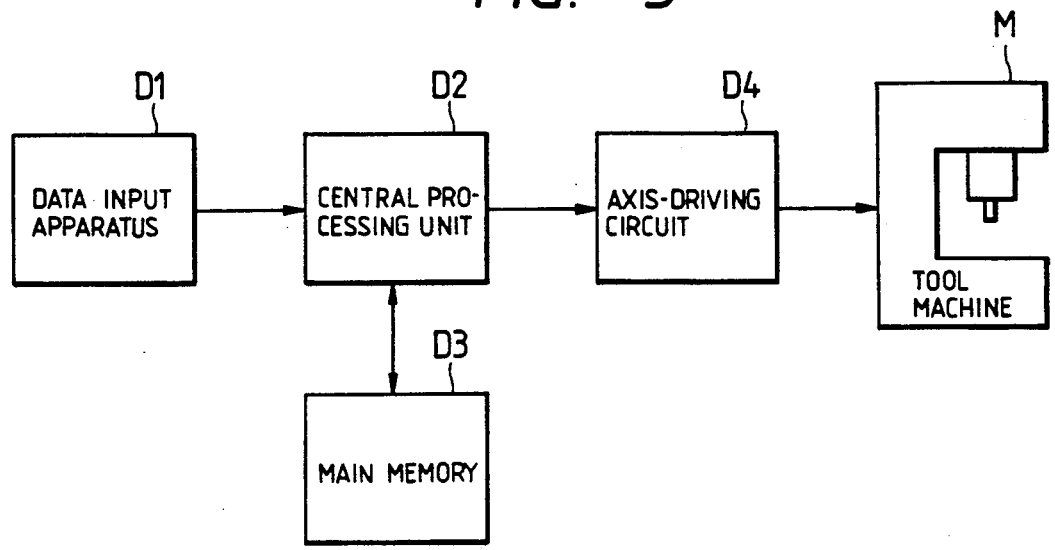
FIG. 3 is an arrangement diagram of an NC machine tool to which the method according to the present invention is applied.

Thus, if edge shape data of a curved surface is inputted, for example, in an NC machine tool of FIG. 3 so that the curved surface is designed on the basis of the inputted data to output a tool locus on the basis of the designed curved surface data to thereby drive the machine tool, it is possible to cut a polygon curved surface patch as shown in FIG. 1.

FIG. 3 is a arrangement diagram of an NC machine tool having the above-mentioned curved surface designing function. In FIG. 3, (D1) represents a data input device to which the above-mentioned curved surface definition data (for example, edge boundary data for definition of a curved surface) are inputted by using a keyboard, a CRT display and so on. (D2) represents a central processing unit (hereinafter referred to as CPU) which cooperates with a main memory (D3) to execute calculation of curved surface design on the basis of the given curved surface definition data to obtain a tool locus on the basis of the obtained curved surface so as to output the tool locus to a respective-shafts driving circuit (D4) in the next stage for driving the respective shafts. A machine tool (M) is driven by the output of the respective-shafts driving circuit (D4) so that the curved surface can be cut as described above.

Although, in the above-mentioned embodiment, as a curved surface equation, $$S = \sum_{i=a}^{f} B_i(Q_i + iD_i)$$

is used as a curved surface equation, the curved surface equation may be expressed as follows without inputting the tangent vector $D_i$.

$$S = \sum_{i=a}^{f} B_i Q_i$$

Although plural curved surfaces can be smoothly combined if the tangent vector is taken into consideration, the latter curved surface equation may be used in the case where there is not such a request. Moreover, in the case of the latter equation, the blending functions $B_a$, $B_b$, $B_c$, $B_d$, $B_e$ and $B_f$ may be expressed as follows (reference is made to FIG. 8).

$B_a=\Phi_a/S$, $B_b=\Phi_b/S$, $B_c=\Phi_c/S$, $B_d=\Phi_d/S$, $B_e=\Phi_e/S$, $B_f=\Phi_f/S$ where
$\Phi a=(1-a)$b c d e f
$\Phi b=(1-b)$c d e f a
$\Phi c=(1-c)$d e f a b
$\Phi d=(1-d)$e f a b c
$\Phi e=(1-e)$a b c d e and,
$S=\Phi a+\Phi b+\Phi c+\Phi d+\Phi e+\Phi f$ Although description has been made as to the case where the number of the sides is six in the above-mentioned embodiment, the present invention is not limited to the embodiment but includes the case of a curved surface generally constituted by n sides ($n \leq 3$).

Figure 13:
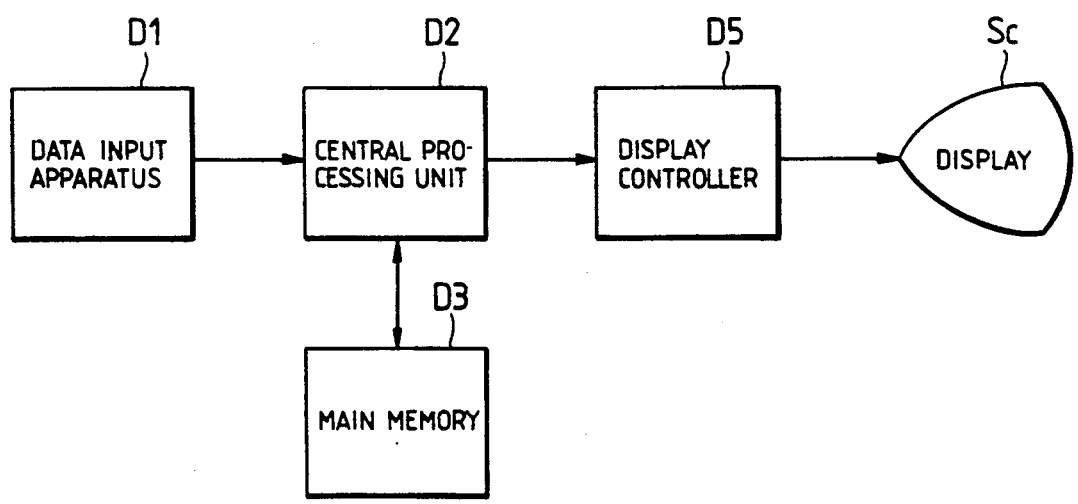
FIG. 13 is an arrangement diagram of a CRT display to which the method according to the present invention is applied.

Other than a machine tool, the present invention is applicable to use for planning design by use of a CRT display (SC) and a display controller (D5) as shown in FIG. 13 in such a manner as to display a curved surface on a CRT screen. In FIG. 13, (D1), (D2) and (D3) represent the same parts as those in FIG. 3.

Figure 14:
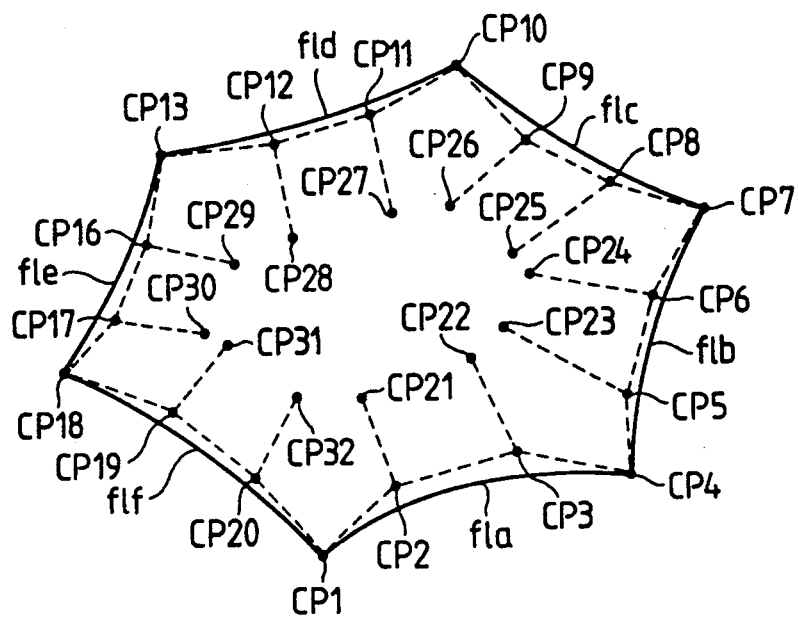
FIG. 14 is a diagram illustrating an example in which three-dimensional coordinate values and tangent vectors of respective sides are expressed by control points to thereby create a curved surface.
Figure 15:
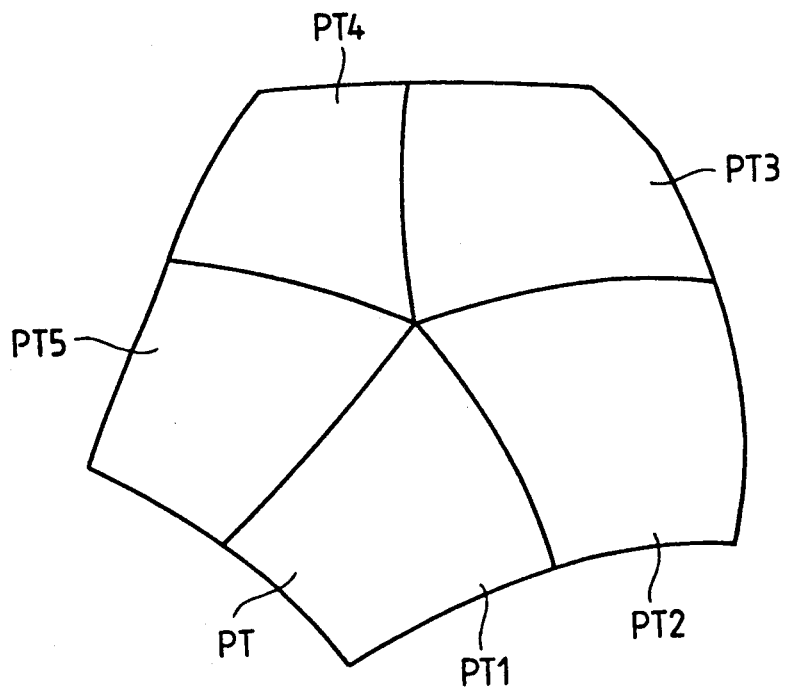
FIG. 15 is a diagram illustrating a prior art.

Further, the three-dimensional coordinate values and the tangent vectors on the respective sides may be expressed by using the control points as shown in FIG. 14. In FIG. 14, for example, the shape P of the side $fl_a$ is expressed with a parameter t ($0 \leq t \leq 1$) by the following equation by using the control points CP1, CP2, CP3 and CP4

$$P = (1-t)^3 CP1 = 3(1-t)^2 t\, CP2 + 3(1-t)t^2 CP3 + t^3 CP4$$

The tangent vector on the side $fl_a$ is expressed by the following equation in the same manner.

$$D = (1 - t)^3 (CP32 - CP1) + 3(1 - t)^2 (CP21 - CP2) + 3(1 - t)t^2 (CP22 - CP3) + t^3(CP23 - CP4)$$

As to the other side $fl_b$, $fl_c$, $fl_d$, $fl_e$ and $fl_f$, the shape and the tangent vector of each side are expressed by the control points in the same manner so that the design of a curved surface is also achieved by making them as data for the present invention.

As has to been described above, a curved surface designing method according to the present invention, correspondingly to given n-sides data, can obtain a regular n-sided polygon in a parameter space, calculate distance parameters, blending values and boundary parameters, and create a curved surface on the basis of the calculated data, so that it is possible to obtain a polygon curved surface patch in a simple way and at a high speed.

What is claimed is:

1. A method of operating a CAD/CAM system comprising designing a curved surface in accordance with input data and generating control signals for said CAD/CAM system in accordance with the designed curved surface, said method comprising the steps of:
    a first step of inputting data identifying a number n of sides of a polygonal curved surface as well as edge shape data for said sides, where n is an integer greater than 3;
    a second step of generating a regular n-sided polygon in a two-dimensional parameter space in accordance with the number n of the inputted sides;
    a third step of obtaining perpendiculars from an arbitrary point P inside said regular n-sided polygon onto the sides thereof or prolonged lines of said sides in said two-dimensional parameter space in accordance with the number n of the inputted sides;
    a fourth step of obtaining the length of said perpendiculars between said point P and respective sides of said polygon as distance parameters;
    a fifth step of obtaining blending values which take the value 1 on one of said sides of said n-sided polygon and the value 0 on the other sides, which blending values are interpolated smoothly from the value 0 to the value 1 within said regular n-sides polygon, a partial differential of each blending value with respect to one of said distance parameters having a value of zero at the side associated with said one distance parameter;
    a sixth step of mapping said point P onto said sides and obtaining, as boundary parameters, ratios of the portions of said sides which are divided by said mapped points;
    a seventh step of generating three-dimensional coordinate values and values of tangent vectors on said sides on the basis of said boundary parameters;
    an eighth step of calculating points on said curved surface on the basis of said distance parameters, said blending values, said three-dimensional coordinate values and said tangent vectors; and
    a ninth step of generating said control signals for controlling said CAD/CAM system, using said calculated points.

2. A curved surface designing method according to claim 1, wherein said first step further comprises a step of inputting tangent vectors on said sides.

3. A curved surface designing method according to claim 1, wherein the boundary parameter for each side is a ratio between distance parameters of the sides adjacent to said each side.

4. A curved surface designing method according to claim 1, wherein the boundary parameter for each side is a rate at which a point R on said each side divides said each side, said point R being defined as an intersecting point between said each side and a straight line connecting said point P and a point of intersection between prolonged lines of the two sides adjacent to said each side.

5. A curved surface designing method according to claim 1, wherein said three-dimensional coordinate values and the values of said tangent vectors are expressed by control points bearing a predetermined positional relationship to each side.

6. A curved surface designing method according to claim 1, said method further comprising the steps of:
    a ninth step of producing a tool locus in said two-dimensional parameter space; and
    a tenth step of calculating a locus on said curved surface on the basis of said tool locus and calculating a real three-dimensional tool locus on the basis of said locus.

7. A curved surface designing method according to claim 6, wherein said first step further comprises a step of inputting tangent vectors on said sides.

8. A curved surface designing method according to claim 6, wherein the boundary parameter for each side is a ratio between distance parameters of the sides adjacent to said each side.

9. A curved surface designing method according to claim 6, wherein the boundary parameter for each side is a rate at which a point R on said each side divides said each side, said point R being defined as an intersecting point between said each side and a straight line connecting said point P and a point of intersection between prolonged lines of the two sides adjacent to said each side.

10. A curved surface designing method according to claim 6, wherein said three-dimensional coordinate values and the values of said tangent vectors are expressed by control points bearing a predetermined positional relationship to each side.

11. A curved surface designing method according to claim 1, said method further comprising the steps of:
    a ninth step of drawing and displaying the obtained curved surface on a display; and
    a tenth step of producing a tool locus in said two-dimensional parameter space.

12. A curved surface designing method according to claim 11, wherein said first step further comprises a step of inputting tangent vectors on said sides.

13. A curved surface designing method according to claim 11, wherein the boundary parameter for each side is a ratio between distance parameters of the sides adjacent to said each side.

14. A curved surface designing method according to claim 11, wherein the boundary parameter for each side is a rate at which a point R on said each side divides said each side, said point R being defined as an intersecting point between said each side and a straight line connecting said point P and a point of intersection between prolonged lines of the two sides adjacent to said each side.

15. A curved surface designing method according to claim 11, wherein said three-dimensional coordinate values and the values of said tangent vectors are expressed by control points bearing a predetermined positional relationship to each side.

16. The method of claim 1 further comprising using said control signals to control the machining of a work piece with a numerical control (NC) machine tool.

17. A method of operating a machining device for machining a workpiece, said method comprising the steps of designing a curved surface in accordance with data input via an input device, providing machining control output data in accordance with the designed surface, and controlling said machining device to operate on said workpiece in accordance with the machining control output data, said method comprising the steps of:
- a first step of inputting data identifying a number n of sides of a polygonal curved surface as well as edge shape data for said sides, where n is an integer greater than 3;
- a second step of generating a regular n-sided polygon in a two-dimensional parameter space in accordance with the number n of the inputted sides;
- a third step of obtaining perpendiculars from an arbitrary point P inside said regular n-sided polygon onto the sides thereof or prolonged lines of said sides in said two-dimensional parameter space in accordance with the number n of the inputted sides;
- a fourth step of obtaining the length of said perpendiculars between said point P and respective sides of said polygon as distance parameters;
- a fifth step of obtaining blending values which take the value 1 on one of said sides of said n-sided polygon and the value 0 on the other sides, which blending values are interpolated smoothly from the value 0 to the value 1 within said regular n-sided polygon, a partial differential of each blending value with respect to one of said distance parameters having a value of zero at the side associated with said one distance parameter;
- a sixth step of mapping said point P onto said sides and obtaining, as boundary parameters, ratios of the portions of said sides which are divided by said mapped points;
- a seventh step of generating three-dimensional coordinate values and values of tangent vectors on said sides on the basis of said boundary parameters;
- an eighth step of calculating points on said curved surface on the basis of said distance parameters, said blending values, said three-dimensional coordinate values and said tangent vectors;
- a ninth step of generating said machining control output data in accordance with said calculated points; and
- a tenth step of controlling said machining device in accordance with said machining control output data.

18. A method of fabricating an article via a machining system, said method comprising the steps of inputting data via a data input device, processing said data in a data processing device to design at least one curved surface of said article, and driving a machine tool in accordance with the results of said processing to machine a workpiece to form said article, wherein:
said step of inputting data comprises
- inputting data identifying a number n of sides of a polygonal curved surface as well as edge shape data for said sides, where n is an integer greater than 3;

said step of processing said data comprises
- generating a regular n-sided polygon in a two-dimensional parameter space in accordance with the number n of the inputted sides;
- obtaining perpendiculars from an arbitrary point P inside said regular n-sided polygon onto the sides thereof or prolonged lines of said sides in said two-dimensional parameter space in accordance with the number n of the inputted sides;
- obtaining the length of said perpendiculars between said point P and respective sides of said polygon as distance parameters;
- obtaining blending value which take the value 1 on one of said sides of said n-sided polygon and the value 0 on the other sides, which blending values are interpolated smoothly from the value 0 to the value 1 within said regular n-sided polygon, a partial differential of each blending value with respect to one of said distance parameters having a value of zero at the side associated with said one distance parameter;
- mapping said point P onto said sides and obtaining, as boundary parameters, ratios of the portions of said sides which are divided by said mapped points;
- generating three-dimensional coordinate values and values of tangent vectors on said sides on the basis of said boundary parameters; and
- calculating points on said curved surface on the basis of said distance parameters, said blending values, said three-dimensional coordinate values and said tangent vectors; and said step of driving said machine tool comprises
- generating control signals in accordance with said calculated points; and
- driving said machine tool in accordance with said control signals.

* * * * *